(12) United States Patent
Burnett

(10) Patent No.: US 8,433,491 B2
(45) Date of Patent: Apr. 30, 2013

(54) ELECTROMECHANICAL DECELERATION SYSTEM AND METHOD FOR OPERATING THE SAME

(75) Inventor: Casel Glenn Burnett, Walton, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 315 days.

(21) Appl. No.: 12/903,162

(22) Filed: Oct. 12, 2010

(65) Prior Publication Data

US 2012/0089311 A1    Apr. 12, 2012

(51) Int. Cl.
*G06F 7/70*    (2006.01)

(52) U.S. Cl.
USPC ............... 701/70; 701/81; 701/83; 303/166; 303/167

(58) Field of Classification Search .................. 701/70, 701/79, 80, 81, 83, 93; 303/151, 166, 167
See application file for complete search history.

(56) References Cited

U.S. PATENT DOCUMENTS

| | | | |
|---|---|---|---|
| 2,815,502 A | 12/1957 | Zeller | |
| 3,574,413 A | 4/1971 | Euga | |
| 3,690,737 A | 9/1972 | Neese et al. | |
| 5,833,326 A | 11/1998 | Hsiao et al. | |
| 5,865,279 A | 2/1999 | Nommensen | |
| 5,887,954 A | 3/1999 | Steiner et al. | |
| 5,895,098 A | 4/1999 | Stacey et al. | |
| 6,249,736 B1 | 6/2001 | Schmidt et al. | |
| 6,315,370 B1 | 11/2001 | Feigel et al. | |
| 6,851,764 B2 | 2/2005 | Giers et al. | |
| 7,228,945 B2 | 6/2007 | O'Neill | |
| 2005/0110342 A1 | 5/2005 | Eberling et al. | |
| 2007/0126282 A1 | 6/2007 | Hwang | |
| 2007/0228822 A1* | 10/2007 | Hirata | 303/151 |
| 2010/0012445 A1 | 1/2010 | Ollat et al. | |
| 2010/0250081 A1* | 9/2010 | Kinser et al. | 701/70 |

\* cited by examiner

*Primary Examiner* — Gertrude Arthur Jeanglaude
(74) *Attorney, Agent, or Firm* — Snell & Wilmer LLP

(57) ABSTRACT

A deceleration system may be used for decreasing a speed of a vehicle having a plurality of wheels. The deceleration system may include a brake command receiving device configured to receive a brake command for decelerating the vehicle, a brake command sensor configured to determine a brake magnitude and a brake rate based on the brake command, a control device configured to generate a plurality of electronic brake signals based on the brake magnitude and the brake rate, and a plurality of braking devices, each of which is configured to receive one of the plurality of electronic brake signals, convert the respective electronic brake signal to a mechanical brake force, and impart the mechanical brake force to at least one of a rotor or a drum of the respective wheel, thereby causing a deceleration of the vehicle.

20 Claims, 11 Drawing Sheets

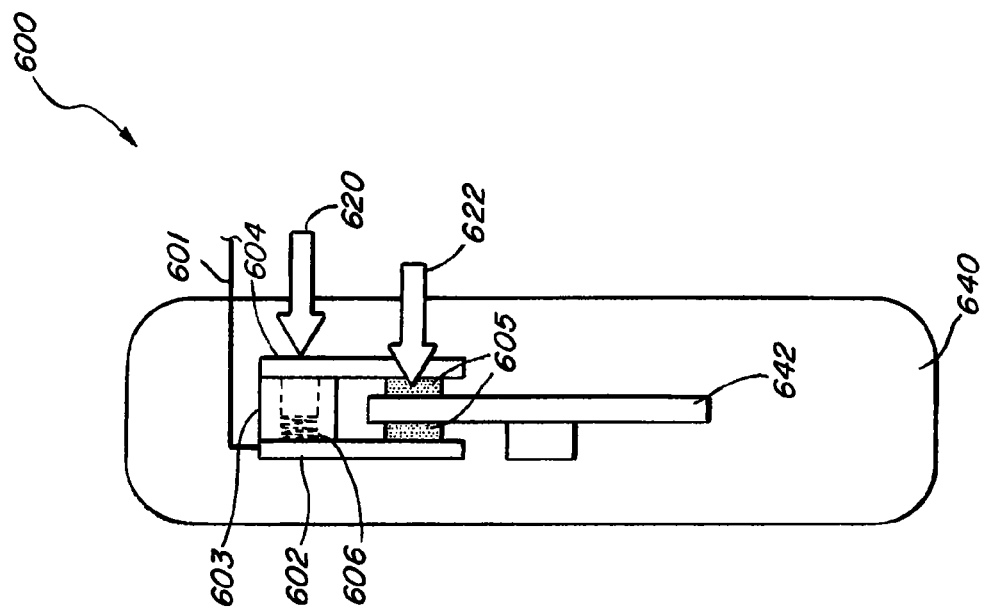
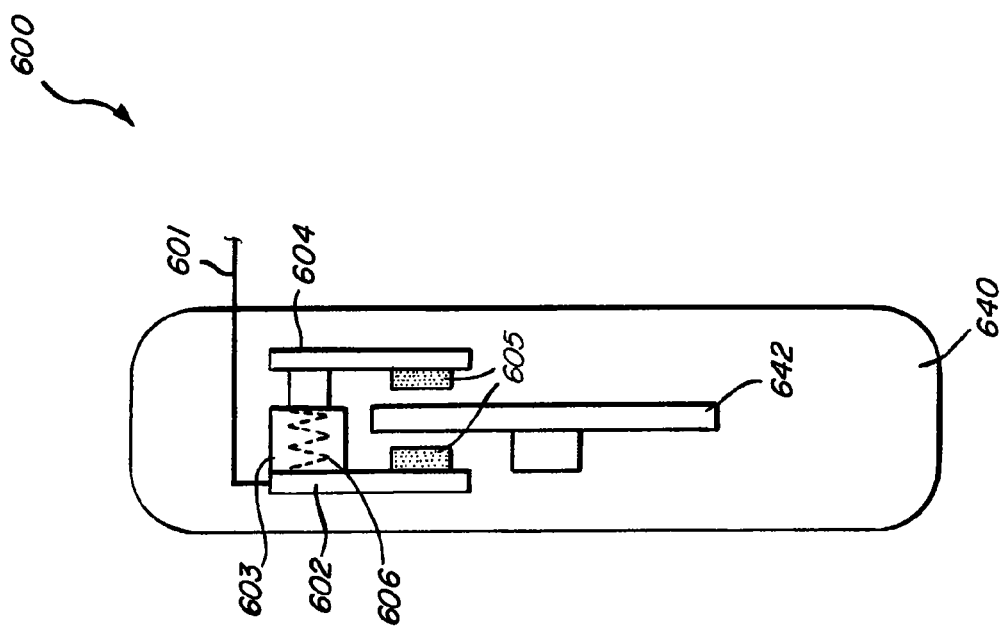

ELECTROMECHANICAL DECELERATION SYSTEM AND METHOD FOR OPERATING THE SAME

BACKGROUND

1. Field

The present invention relates generally to the field of motor vehicle deceleration system, and more particularly to an electromechanical deceleration system.

2. Description of Related Art

Demand for reliable and efficient motor vehicles continues to grow, driven primarily by safety conscious and cost sensitive motor vehicle consumers. Among other internal systems of a motor vehicle, the deceleration system (a.k.a. the braking system) may play an important role in characterizing or defining the motor vehicle's reliability and efficiency. For example, a well designed deceleration system may help the driver avoid many automobile related accidents by timely decelerating the motor vehicle. For another example, a well designed deceleration system may drive down the cost of manufacturing because it may require fewer mechanical parts and an easier assembly process. For yet another example, a well designed deceleration system may reduce the overall weight of the vehicle, so that fuel consumption of the vehicle may be reduced accordingly.

Attempts have been made in the past to improve the conventional deceleration systems used in various types of motor vehicles. Mainly, these efforts are directed towards improving the reliability and efficiency of the conventional hydraulic braking system, which may generally include a master cylinder controlling a few local brake cylinders. Normally, the master cylinder is located adjacent to the engine whereas the local brake cylinders are located adjacent to the wheels. As such, long hydraulic lines are used for the transfer of brake fluid between the master cylinder and the local brake cylinders. However, deceleration systems using hydraulic lines may suffer from several drawbacks. For example, the hydraulic lines may be costly and difficult to install. For another example, the hydraulic lines may be susceptible to the leakage of brake fluid, which may negatively impact the reliability of the overall deceleration system. For yet another example, the hydraulic lines may also add a substantial amount of weight to the motor vehicle, such that the motor vehicle may be less efficient.

Thus, there is a need for a more reliable and efficient deceleration system which may eliminate the use of long hydraulic lines.

SUMMARY

One embodiment of the present invention is to provide a reliable deceleration system which may adopt an electromechanical braking mechanism with electronic feedback control. Another embodiment of the present invention is to provide an efficient deceleration system which does not require the installation of long hydraulic lines.

In one embodiment, a deceleration system may be used for decreasing a speed of a vehicle having a plurality of wheels, the plurality of wheels positioned within a plurality of local regions of the vehicle, each of the plurality of wheels having at least one of a rotor or a drum. The deceleration system may include a brake command receiving device configured to receive a brake command for decelerating the vehicle, the brake command receiving device positioned within a central region of the vehicle, the central region spaced apart from the plurality of local regions, a brake command sensor coupled to the brake command receiving device, and configured to determine a brake magnitude and a brake rate based on the brake command, a control device coupled to the brake command sensor, and configured to generate a plurality of electronic brake signals based on the brake magnitude and the brake rate, and a plurality of braking devices positioned within the plurality of local regions, each of the plurality of braking devices coupled to the control device and one of the plurality of wheels, and configured to receive one of the plurality of electronic brake signals, convert the respective electronic brake signal to a mechanical brake force, and impart the mechanical brake force to the rotor or the drum of the respective wheel, thereby causing a deceleration of the vehicle.

In another embodiment, a deceleration system may be used for decreasing a speed of a vehicle having a plurality of wheels, the plurality of wheels positioned within a plurality of local regions of the vehicle, each of the plurality of wheels having at least one of a rotor or a drum. The deceleration system may include a brake command receiving device configured to receive a brake command for decelerating the vehicle, the brake command receiving device positioned within a central region of the vehicle, the central region spaced apart from the plurality of local regions, a brake command sensor coupled to the brake command receiving device, and configured to determine a brake magnitude and a brake rate based on the brake command, a control device positioned within the central region, and may have a brake force computing device coupled to the brake command sensor, and configured to compute a total brake force based on the brake magnitude and the brake rate, a brake force distribution device coupled to the brake force computing device, and configured to determine a plurality of local brake forces, each of the plurality of brake forces based on a rotational speed of one, of the plurality of wheels and the total brake force, and an output device coupled to the brake force distribution device, and configured to generate the plurality of electronic brake signals based on the plurality of local brake forces, and a plurality of braking devices positioned within the plurality of local regions, each of the plurality of braking devices coupled to one of the plurality of wheels, and configured to receive one of the plurality of electronic brake signals, convert the respective electronic brake signal to a mechanical brake force, and impart the mechanical brake force to the rotor or the drum of the respective wheel, thereby causing a deceleration of the vehicle.

In yet another embodiment, a method may be used for decelerating a vehicle having a plurality of wheels each having at least one of a rotor or a drum, the plurality of wheels positioned within a plurality of local regions of the vehicle. The method may include the steps of receiving, using a brake command receiving device positioned within a central region of the vehicle, a brake command for decelerating the vehicle, determining, by using a brake command sensor coupled to the brake command receiving device, a brake magnitude and a brake rate based on the received brake command, generating, by using a control device coupled to the brake command sensor and positioned within the central region, a plurality of electronic brake signals based on the brake magnitude and the brake rate, converting, by using a plurality of braking devices coupled to the control device and positioned within the plurality of local regions, the plurality of electronic brake signals to a plurality of mechanical brake forces, and imparting, by using the plurality of braking devices, the plurality of mechanical brake forces to the rotors or the drums of the plurality of wheels, thereby decelerating the vehicle.

BRIEF DESCRIPTION OF THE DRAWINGS

Other systems, methods, features and advantages of the present invention will be or will become apparent to one with skill in the art upon examination of the following figures and detailed description. It is intended that all such additional systems, methods, features and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIGS. 6A-6B show a cross-sectional front view of an integrated actuator implemented by an electromagnetic device according to an embodiment of the present invention;

DETAILED DESCRIPTION

Apparatus, systems and methods that implement the embodiment of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between reference elements. In addition, the first digit of each reference number indicates the figure in which the element first appears.

Figure 1A:
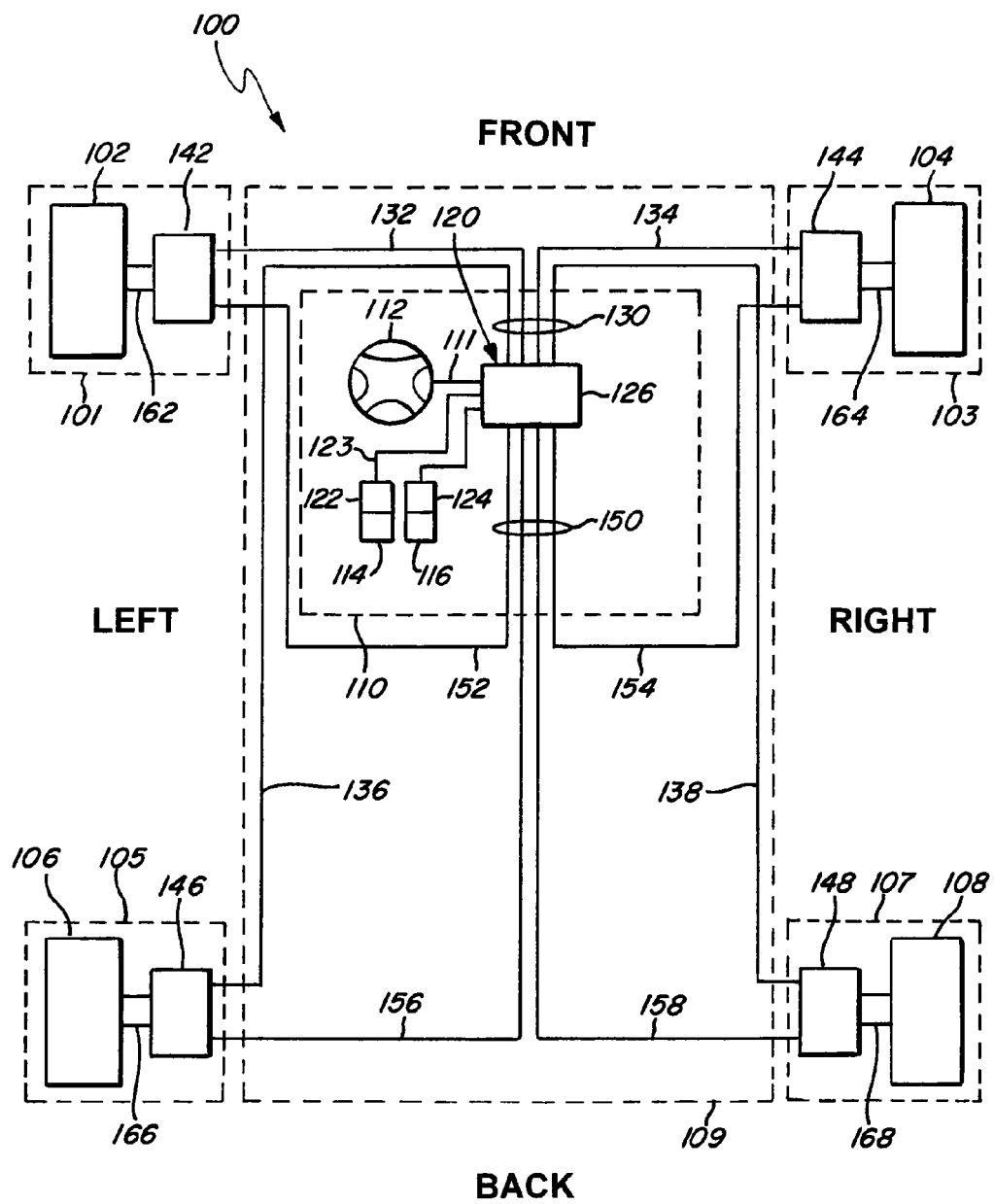
FIG. 1A shows a schematic view of a vehicle equipped with an electromechanical brake system according to an embodiment of the present invention.

FIG. 1A shows a schematic view of a vehicle 100 equipped with an electromechanical brake system 120 according to an embodiment of the present invention. The vehicle 100 may generally be divided into three regions, which may include a central region 110, four local regions 101, 103, 105, and 107, and an intermediate region 109. More specifically, the central region 110 may be a region in which various driver-controlled devices may be positioned. For example, the driver-controlled devices may include a steering wheel 112, an acceleration command receiving device 116 (e.g., a gas pedal), and a brake command receiving device 114 (e.g., a brake pedal) as shown in FIG. 1A. In one embodiment, the central region 110 may cover only the driver seat area. In another embodiment, the central region 110 may cover the front end area of the vehicle, the driver seat area, and the front passenger seat area. In yet another embodiment, the central region 110 may cover an area in which the engine may be installed.

The four local regions 101, 103, 105, and 107 may be located peripherally in relation to the central region 110, and it may be the regions in which the wheels of the vehicle 100 may be positioned. For example, the front left (FL) wheel 102 may be positioned in the first local region 101, the front right (FR) wheel 104 may be positioned in the second local region 103, the back left (BL) wheel 106 may be positioned in the third local region 105, and the back right (BR) wheel 108 may be positioned in the fourth local region 107.

The intermediate region 109 may be located between the central region 110 and the four local regions 101, 103, 105, and 107, and it may be cover a substantial area of the vehicle 100. Conventional hydraulic brake system may include a master cylinder positioned within the central region 110 and four local cylinders located at the local regions 101, 103, 105, and 107. To conduct hydraulic fluid and transfer hydraulic pressure from the master cylinder to the local cylinders, several hydraulic lines may be laid across the intermediate region 109. However, these hydraulic lines (a.k.a. hydraulic pipes) are difficult to install and maintain, and they may add significant weight to the vehicle, thereby rendering the vehicle less energy efficient. One embodiment of the present invention is to provide an electromechanical deceleration system, which may eliminate the use of long hydraulic lines in the intermediate region 109.

Figure 1B:
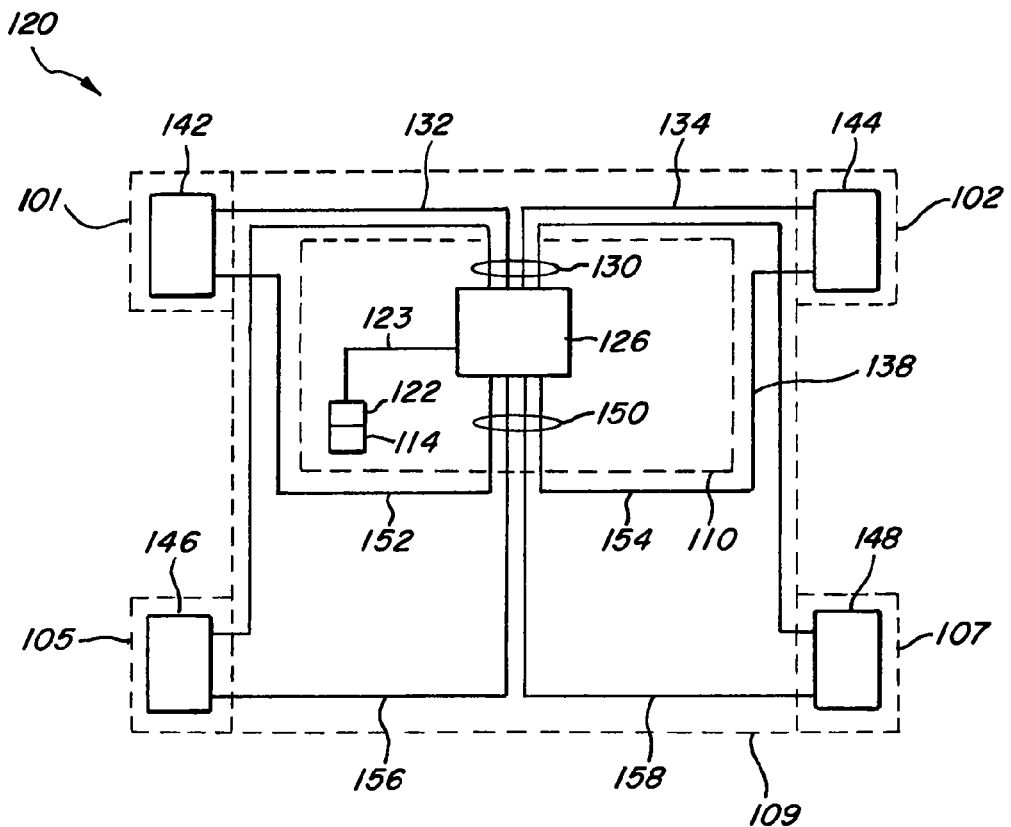
FIG. 1B shows an isolation schematic view of the electromechanical brake system of FIG. 1A according to an embodiment of the present invention.
Figure 1C:
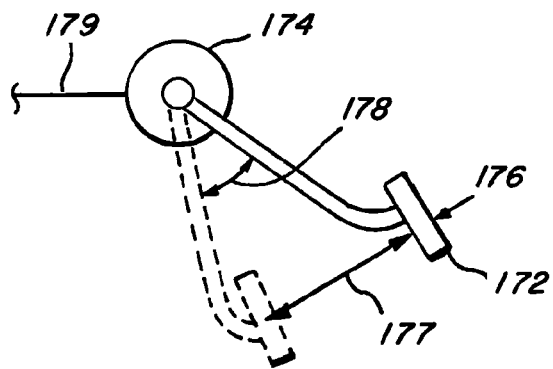
FIG. 1C shows a side view of a brake command receiving device and a brake command sensor according to an embodiment of the present invention.

According to an embodiment, as shown in FIG. 1B, an electromechanical brake system 120 may generally include four components, which may include a brake command receiving device 144, a brake command sensor 122, a control device (a.k.a. an engine control unit) 126, and four braking devices 142, 144, 146, and 148. The brake command receiving device 144 may be used to receive a brake command from a driver. For example, the brake command receiving device 144 may be a conventional brake pedal 172 as shown in FIG. 1C. For another example, the brake command receiving device 144 may be a mechanical button with variable resistance. For yet another example, the brake command receiving device 144 may be a control stick. In sum, the brake command receiving device 144 may be displaced by the driver for a displaced distance 177, along which the displacement resistance 178 may be constant or increasing.

Referring again to FIG. 1B, the brake command sensor 122 may be used to sense or determine a brake magnitude and/or a brake rate. The brake magnitude may indicate how much brake force the driver may want to apply. In one embodiment, the brake magnitude may be measured by the total displaced distance 177. In another embodiment, the brake magnitude may be measured by the displacement resistance 178 built up in the brake command receiving device 114. The brake rate may indicate how fast the driver may want to apply the brake force. In one embodiment, the brake rate may be measured by the time it takes the brake command receiving device 114 to be displaced from its initial position to a new position. In another embodiment, the brake rate may be determined by measuring a pressing force 176 asserted by the driver.

In order to achieve the above functions, the brake command sensor 122 may be capable of sensing a mechanical force, a displacement caused by the mechanical force, and/or a rate of application of the mechanical force. Moreover, the brake command sensor 122 may be capable of converting the sensed quantities into one or more electronic signals 123 for further processing. For example, the one or more electronic signals 123 may carry digital or analog data that are related to or representative of the brake magnitude and the brake rate. As such, the brake command sensor 122 may be implemented by an optical sensor, a pressure sensor, a displacement sensor, and/or a timer according to various embodiments of the present invention. For example, the brake command sensor 122 may be implemented by the optical sensor 174 as shown in FIG. 1C. The optical sensor 174 may detect the motion and relative positions of the brake pedal 172, as well as the time elapsed while the brake pedal 172 is being displaced. As a result, the optical sensor 174 may generate an electronic signal 179, which may carry information related to the brake magnitude and the brake rate received by the brake pedal 172.

The discussion now turns to the control device 126, which may be coupled to the brake command sensor 122 for receiving the one or more electronic signals 123, which may carry information pertinent to the brake magnitude and the brake rate. In one embodiment, the control device 126 may be positioned within the central region 110 as shown in FIGS. 1A and 1B. In another embodiment, the control device 126 may be positioned within the intermediate region 109. The control device 126 may generate a group of electronic brake signals 130 based on the brake magnitude and/or the brake rate. These electronic brake signals 130 may be used for controlling the deceleration process of the vehicle 100. The generation of the group of electronic brake signals 120 may be based on one or more brake force algorithms, such that the control device 126 may include one or more processors for executing the one or more brake force algorithms.

As discussed herein, the one or more processors may be any computing device capable of receiving data, processing the received data, and outputting the processed data. For example, the processors can be coupled to a display and a memory. The processors may be implemented using hardware, software, firmware, middleware, microcode, or any combination thereof. The processor may be an Advanced RISC Machine (ARM), a computer, a controller, a digital signal processor (DSP), a microprocessor, circuitry, a processor chip, or any other device capable of processing data, and combination thereof. The memory may include or store various routines and data. The term "memory" includes, but is not limited to, random access memory (RAM), flash memory, read-only memory (ROM), EPROM, EEPROM, registers, hard disk, removable disk, CD-ROM, DVD, Blu-ray disk, wireless channels, and various other media capable of storing, containing or carrying instruction(s) and/or data. The display may be a CRT, LCD, LED, and/or plasma display screen or a touch screen.

Referring again to FIG. 1A, the four braking devices 142, 144, 146, and 148 may each be positioned within one of the local regions 101, 103, 105, and 107. The front left (FL) braking device 142 may be positioned within the first local region 101 and it may be coupled to the FL wheel 102 via a front left (FL) mechanical device 162. The front right (FR) braking device 144 may be positioned within the second local region 103 and it may be coupled to the FR wheel 104 via a front right (FR) mechanical device 164. The back left (BL) braking device 146 may be positioned within the third local region 105 and it may be coupled to the BL wheel 106 via a back left (BL) mechanical device 166. The back right (BR) braking device 148 may be positioned within the fourth local region 107 and it may be coupled to the BR wheel 108 via a back right (BR) mechanical device 168. According to an embodiment of the present invention, the FL, FR, BL, and BR mechanical devices 162, 164, 166, and 168 may be four rotor discs or drums, each of which may be incorporated to one of the FL, FR, BL, and BR wheels 102, 104, 106, and 108.

Each of the FL, FR, BL, and BR braking devices 142, 144, 146, and 148 may received the electronic brake signals generated by the control device 126. For example, the FL braking device 142 may receive the FL electronic brake signal 132, the FR braking device 144 may receive the FR electronic brake signal 134, the BL braking device 146 may receive the BL electronic brake signal 136, and the BR braking device 148 may receive the BR electronic signal 138. The FL, FR, BL, and BR electronic brake signals 132, 134, 136, and 138 may each carry information related to the respective brake forces to be applied to the FL, FR, BL, and BR wheels 102, 104, 106, and 108. In one embodiment, the respective brake forces may be uniform in magnitude and synchronous in timing. In another embodiment, the respective brake forces may vary in magnitude but synchronous in timing. In yet another embodiment, the respective brake forces may be uniform in magnitude but asynchronous in timing. In still yet another embodiment, the respective brake forces may vary in magnitude and asynchronous in timing.

As shown in FIGS. 1A and 1B, the electronic brake signals 132, 134, 136, and 136 may be conducted by a first group of conducting devices, which may be distributed across the intermediate region 109 of the vehicle 100. The first group of conducting devices may be implemented by copper wires, aluminum wires, gold wires, silver wires, fiber optics, and/or other conductive material suitable for conducting electronic signals within a distance approximately close to the dimension of a vehicle. The first group of conducting devices may be relatively cheap and easy to install when compared to conventional hydraulic lines. Moreover, the first group of conducting devices may be easier to maintain because they are unlikely to have brake fluid leakage problems, which may be the common maintenance issue of conventional hydraulic lines. According to an embodiment of the present invention, the first group of conducting devices may be used to replace most of the conventional hydraulic lines. Advantageously, the first group of conducting devices may provide a more cost efficient approach in implementing a vehicle deceleration system.

In order to apply the appropriate brake force to the FL, FR, BL, and BR wheels 102, 104, 106, and 108, the braking devices 142, 144, 146, and 148 may each perform several tasks after receiving one of the respective electronic brake signals 132, 134, 136, or 138. For example, the braking devices 142, 144, 146, and 148 may each convert one of the respective electronic brake signals 132, 134, 136, or 138 to a mechanical brake force. For another example, the braking devices 142, 144, 146, and 148 may each impart the respective mechanical brake force to one of the mechanic devices 162, 164, 166, or 168. As a result, the braking devices 142, 144, 146, and 148 may each assert a decelerating frictional force against one of the FL, FR, BL, and BR wheels 102, 104, 106, and 108, thereby causing the vehicle 100 to decelerate.

Furthermore, each of the braking devices 142, 144, 146, and 148 may include several sensing devices for sensing real time physical conditions of the wheels 102, 104, 106, and 108, and for monitoring the real time progress of the deceleration process. Accordingly, each of the braking devices 142, 144, 146, and 148 may generate an electronic feedback signal, which may be received by the control device 126 for further processing. In one embodiment, the electronic feedback signal may carry information relating to a rotational speed of the respective wheel, a normal force asserted by the ground at which the respective wheel contact, and/or the operational status of the respective braking device.

More specifically, the FL braking device 142 may generate a FL electronic feedback signal 152, the FR braking device 144 may generate a FR electronic feedback signal 154, the BL braking device 146 may generate a BL electronic feedback signal 156, and the BR braking device 148 may generate a BR electronic feedback signal 158. The FL, FR, BL, and BR electronic feedback signals 152, 154, 156, and 158 may be conducted by second conductive devices, which may be bundled to form an electronic feedback bus 150 before being received by the control device 126. According to an embodiment of the present invention, the second conducting devices may be made of materials similar to those of the first conductive devices.

Figure 2:
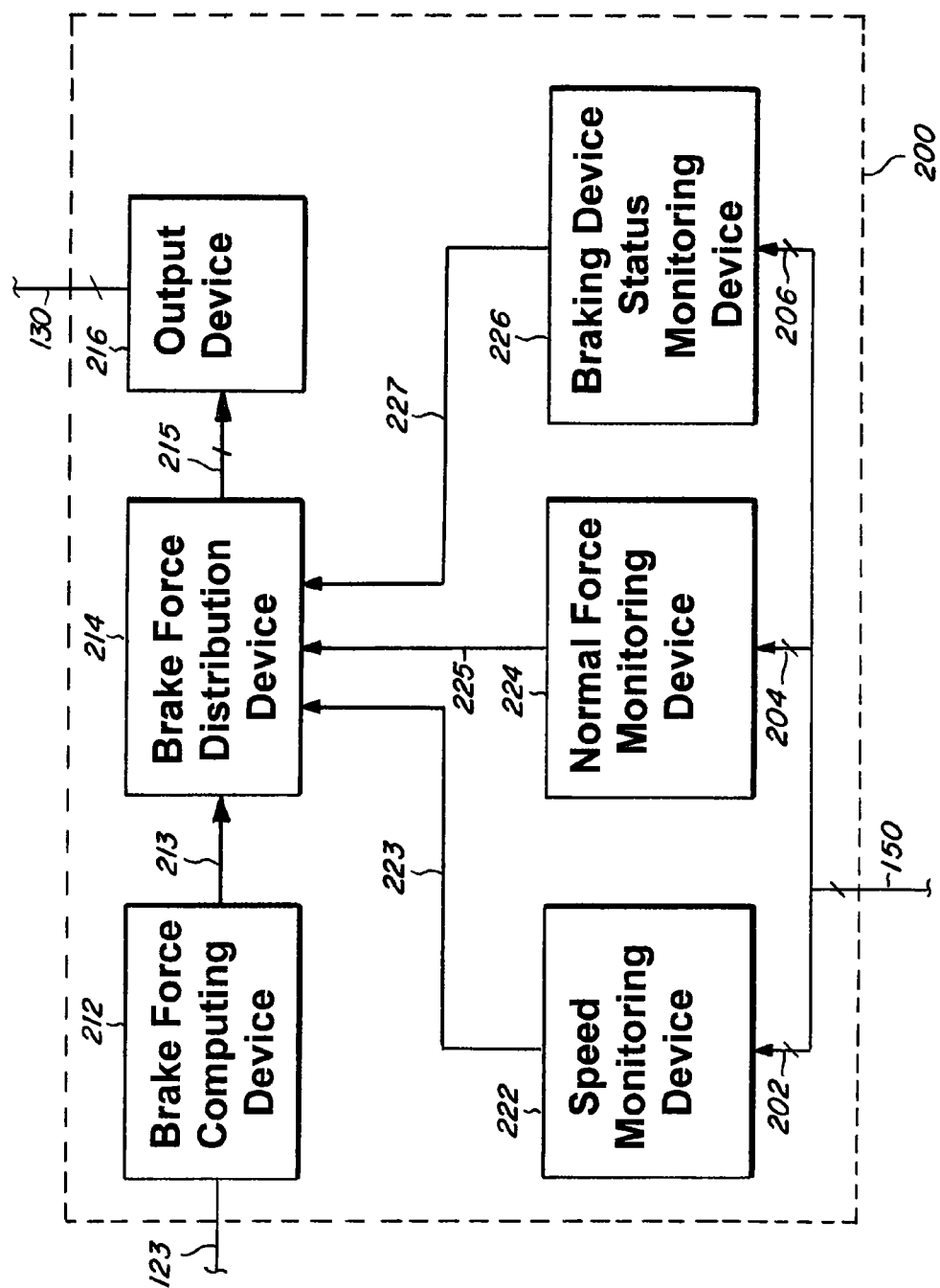
FIG. 2 shows a schematic view of an electronic control device according to an embodiment of the present invention.

The discussion now turns to the internal structure of a control device 200, which may be an engine control unit (ECU). In FIG. 2, a schematic view of the control device 200 is shown according to an embodiment of the present invention. The control device 200 may be an exemplary embodiment of the control device 126, such that it may be used to actuate the various functions of the control device 126 as discussed in FIGS. 1A and 1B. Although the architecture of the control device 200 is used for illustrating one embodiment of the control device 126, other architectures may be used for realizing the functional features of the control device 126.

Generally, the control device 200 may include six components, such as a brake force computing device 212, a brake force distribution device 214, a speed monitoring device 222, a normal force monitoring device 224, a braking device status monitoring device 226, and an output device 216. In one embodiment, each of these six devices may be implemented by a single processor, such that the control device 200 may include six individual processors. In another embodiment, all six devices may be implemented by one processor, such that each of the six devices may be a virtual module of that particular processor. In yet another embodiment, the brake force computing device 212 and the brake force distribution device 214 may be implemented in a first processor, the speed monitoring device 222, the normal force monitoring device 224, and the braking device status monitoring device 226 may be implemented in a second processor, and the output device may be implemented by a third processor. In order to optimize the performance of each device, the first processor may include a high density logic unit, the second processor may include a high speed digital-to-analog converter (DAC), and the third processor may include a high voltage low noise output buffer.

The brake force computing device 212 may be coupled to the brake command sensor 122, such that it may receive the electronic signal 123, which may carry the information related to the brake magnitude and the brake rate. The brake force computing device 212 may compute a total brake force 213 based on the brake magnitude and the brake rate. The computation may use various mathematic models to simulate and/or reconstruct the input force asserted by the driver and to calculate the total brake force 213 based on the corresponding simulated input force.

Generally, the total brake force 213 may be directly proportional to the brake magnitude and/or the brake rate. More specifically, the brake magnitude may help determine the absolute amount of brake force to be generated, and the brake rate may help determine the rate of application of the absolute amount of brake force. For example, if a driver presses on the brake pedal slowly but heavily (i.e., large brake magnitude but low brake rate), the total brake force 213 may have a large absolute value but it may be applied to the rotors or the drums of the wheels gradually. For another example, if the driver presses on the brake pedal abruptly but lightly (i.e., small brake magnitude but high brake rate), the total brake force 213 may have a small absolute value but it may be applied to the rotors or the drums of the wheels rapidly. For yet another example, if the driver presses on the brake pedal abruptly and heavily (i.e., large brake magnitude and high brake rate), the total brake force 213 may have a large absolute value and it may be applied to the rotors or the drums of the wheels rapidly.

The brake force distribution device 214 may be coupled to the brake force computing device 212, such that it may receive an electronic signal that carries information related to the total brake force 213. Generally, the brake force distribution device 214 may be used for determining a distribution of the total brake force 213 among the four wheels of the vehicle. In other words, the brake force distribution device 214 may be used to calculate how much brake force each of the FL, FR, BL, and BR wheels 102, 104, 106, and 108 may need to properly decelerate the vehicle 100. In one embodiment, the total brake force 213 may be evenly distributed among the FL, FR, BL, and BR wheels 102, 104, 106, and 108. In another embodiment, the total brake force 213 may be distributed among the FL, FR, BL, and BR wheels 102, 104, 106, and 108 based on one or more real time physical conditions of the wheels and/or the braking devices that may be used for decelerating the wheels.

Figure 3A:
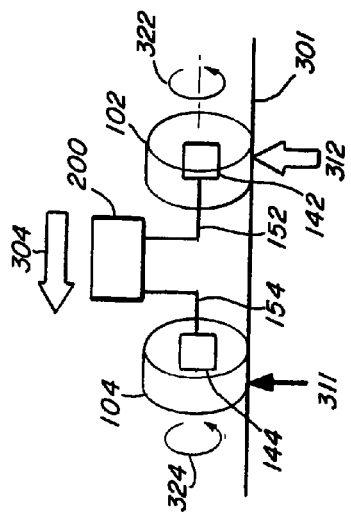
FIGS. 3A-3D show the front views of the electromechanical braking system operating in various conditions according to various embodiments of the present invention.

For example, as shown in FIG. 3A, the FL and FR wheels 102 and 104 of the vehicle, which may be making a left turn 302, may each be operated under a first set of physical conditions. In one embodiment, the FR wheel 104 may have a FR rotational speed 324, which may be higher than a FL rotational speed 322 of the FL wheel 102. In another embodiment, the ground surface 301 may assert a FR normal force 311 against the FR wheel 104, which may be greater than a FL normal force 312 asserted by the ground surface 301 against the FL wheel 102. As such, the FR wheel 104 may require a larger local brake force than the FL wheel 102.

Figure 3C:
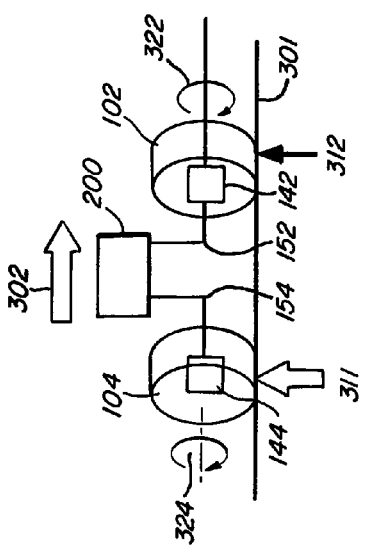
Figure 3B:
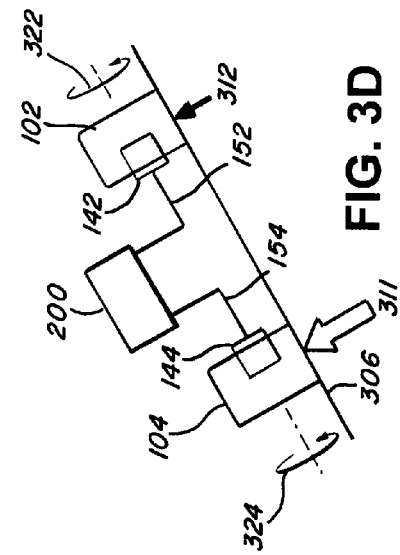

For another example, as shown in FIG. 3B, the FL and FR wheels 102 and 104 of the vehicle, which may be making a right turn 304, may each be operated under a second set of physical conditions. In one embodiment, the FL rotational speed 322 of the FL wheel 102 may be higher than the FR rotational speed 324 of the FR wheel 104. In another embodiment, the ground surface 301 may assert the FR normal force 311 against the FR wheel 104, which may be less than the FL normal force 312 asserted against the FL wheel 102. As such, the FL wheel 102 may require a larger local brake force than the FR wheel 104.

For another example, as shown in FIG. 3C, the FL and FR wheels 102 and 104 of the vehicle, which may be contacting a first inclined road surface 305, may each be operated under a third set of physical conditions. In one embodiment, the FR rotational speed 324 may be slightly different from the FL rotational speed 322. In another embodiment, the FR normal force 311 may be less than the FL normal force 312. As such, the FR wheel 104 may require a different local brake force than the FL wheel 102.

Figure 3D:
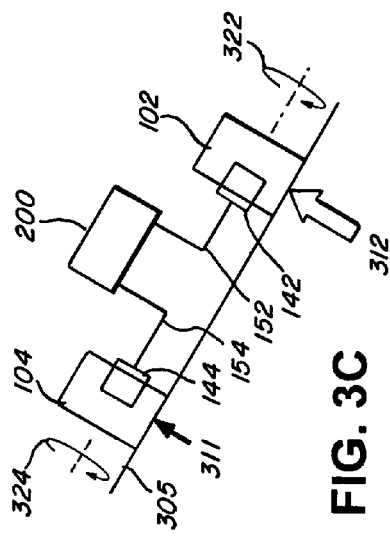

For yet another example, as shown in FIG. 3D, the FL and FR wheels 102 and 104 of the vehicle, which may be contacting a second inclined road surface 306, may each be operated under a fourth set of physical conditions. In one embodiment, the FR rotational speed 324 may be slightly different from the FL rotational speed 322. In another embodiment, the FR normal force 311 may be less than the FL normal force 312. As such, the FR wheel 104 may require a different local brake force than the FL wheel 102.

For illustrative purposes, only the FL and FR wheels 102 and 104 and their corresponding physical conditions are shown and discussed in FIGS. 3A to 3B. Nevertheless, the BL and BR wheels 106 and 108 may be operated under the similar sets of physical conditions, such that the local brake force of the BL wheel 106 may be different from the local brake force of the BR wheel 108.

According to an embodiment of the present invention, the FL braking device 142 may incorporate one or more sensing devices for sensing the FL rotational speed 322 and the FL normal force 312, while the FR braking device 142 may incorporate one or more sensing devices for sensing the FR rotational speed 324 and the FR normal force 311. The sensing devices may include an optical sensor, a pressure sensor, and/or a yaw angle. In real time, the FL and FR braking devices 142 and 144 may sense the physical conditions of the wheels, generate the FL and FR electronic feedback signals 152 and 154, and send them to the control device 200. Similarly, the BL and BR braking devices 146 and 148 may each incorporate one or more sensing devices similar to those incorporated by the FL and FR braking devices 142, and 144. Consequentially, each of the FL, FR, BL, and BR electronic feedback signals 152, 154, 156, and 158 may carry information pertinent to the real time physical conditions of the respective FL, FR, BL, or BR wheel 102, 104, 106, or 108.

According to an embodiment of the present invention, the second conducting devices conducting the FL, FR, BL, and BR electronic feedback signals 152, 154, 156, and 158 may be routed across the intermediate region 109 of the vehicle. Moreover, the FL and FR electronic feedback signals 152 and 154 may be bundled with the BL and BR electronic feedback signals 156 and 158 as shown in FIGS. 1A and 1B to form the electronic feedback bus 150 before being received by the control device 200.

Referring again to FIG. 2, which shows the schematic view of the control device 200, the speed monitoring device 222 may receive a first portion 202 of the electronic feedback bus 150, the normal force monitoring device 224 may receive a second portion 204 of the electronic feedback bus 150, and the braking device status monitoring device 226 may receive a third portion 206 of the electronic feedback bus 150. Specifically, the first portion 202 may contain data pertinent to the real time rotational speeds of the FL, FR, BL, and BR wheels 102, 104, 106, and 108, the second portion 204 may contain data pertinent to the real time normal forces received by the FL, FR, BL, and BR wheels 102, 104, 106, and 108, and the third portion 206 may contain data pertinent to the real time operation status of the FL, FR, BL, and BR braking devices 142, 144, 146, and 148.

As previously discussed, the brake force distribution device 214 may use one or more of the aforementioned real time physical conditions to determine the distribution of the total brake force 213 among the FL, FR, BL, and BR wheels 102, 104, 106, and 108. In one embodiment, for example, the distribution of the total brake force 213 may be based on each wheel's real time rotational speed. Accordingly, the brake force distribution device 214 may be coupled to the speed monitor device 222, which may generate a rotational speed signal 223 based on the first portion 202 of the electronic feedback bus 150. In another embodiment, for example, the distribution of the total brake force 213 may be based on the normal force asserted to each wheel. Accordingly, the brake force distribution device 214 may be coupled to the normal force monitoring device 224, which may generate a normal force signal 225 based on the second portion 204 of the electronic feedback bus 150. In yet another embodiment, for example, the distribution of the total brake force 213 may be based on the operation status of each of the braking devices. Accordingly, the brake force distribution device 214 may be coupled to the braking device status monitoring device 226, which may generate an operation status signal 227 based on the third portion 206 of the electronic feedback bus 150. More specifically, the operation status signal 227 may indicate which of the braking devices that are functioning properly as well as those that are not.

As persons skilled in the art may readily appreciate, the speed monitoring device 222, the normal force monitoring device 224, and the braking device status monitoring device 226 may continuously, iteratively, periodically, and/or randomly monitor the respective first, second and third portions 202, 204, and 206 of the electronic feedback bus 150. For example, the speed monitoring device 224 may regenerate the rotational speed signal 222 every half second. For another example, the speed monitoring device 224 may regenerate the rotational speed signal 222 iteratively while the brake command is being received. For yet another example, the speed monitoring device 224 may regenerate the rotational speed signal 222 when the rotational speed of one or more of the FL, FR, BL, and BR wheels 102, 104, 106, and 108 changes drastically within a short period of time.

Moreover, the brake force distribution device 214 may simultaneously or sequentially receive a combination of the rotational speed signal 223, the normal force signal 225, and/or the operation status signal 227, so that the distribution of the total brake force 213 may be determined based on a combination of information carried by the rotational speed signal 223, the normal force signal 225, and/or the operation status signal 227. Accordingly, the brake force distribution device 214 may fine tune the deceleration process by taking into account the reality that each of the FL, FR, BL, and BR wheels 102, 104, 106, and 108 may require a different amount of brake force during the deceleration process. Advantageously, the brake force distribution device 214 may help provide a deceleration system that may optimize the deceleration process by directing the brake force to the various wheels according to their need. As such, the total deceleration time may be substantially reduced, and the wear and tear of the mechanical brake components (and/or tires) may be substantially minimized.

In one embodiment, the brake force distribution device 214 may determine FL, FR, BL, and BR local brake forces 215 based on the rotational speed of each wheel and the normal force received by each wheel. In another embodiment, the brake force distribution device 214 may determine the FL, FR, BL, and BR local brake forces 215 based on the rotational speed of each wheel and the operation status of each braking device. In yet another embodiment, the brake force distribution device 214 may determine the FL, FR, BL, and BR local brake forces 215 based on the normal force received by each wheel and the operation status of each braking device. In still yet another embodiment, the brake force distribution device 214 may determine the FL, FR, BL, and BR local brake forces 215 based on the rotational speed of each wheel, the normal force received by each wheel, and the operation status of each braking device.

Furthermore, the brake force distribution device 214 may be pre-programmed to continuously, iteratively, periodically, or randomly update the distribution of the total brake force 213 among the FL, FR, BL, and BR wheels 102, 104, 104, and 106. In one embodiment, the brake force distribution device 214 may constantly and continuously update the value of each of the FL, FR, BL, and BR local brake forces 215. In another embodiment, the brake force distribution device 214 may update the value of each of the FL, FR, BL, and BR local brake forces 215 after one or more of the rotational speed signal 223, the normal force signal 225, and the braking device operation status signal 206 are refreshed. Advantageously, the brake force distribution device 214 may adjust the distribution of local brake forces 215 to respond to the changing deceleration conditions instantaneously.

The output device 216 may be coupled to the brake force distribution device 214 such that it may receive the FL, FR, BL, and BR local brake forces 215. According to an embodiment of the present invention, the output device 216 may be used to generate the FL, BR, BL, and BR electronic brake signals 130 by encoding and amplifying the FL, FR, BL, and BR local brake forces 215.

Figure 4A:
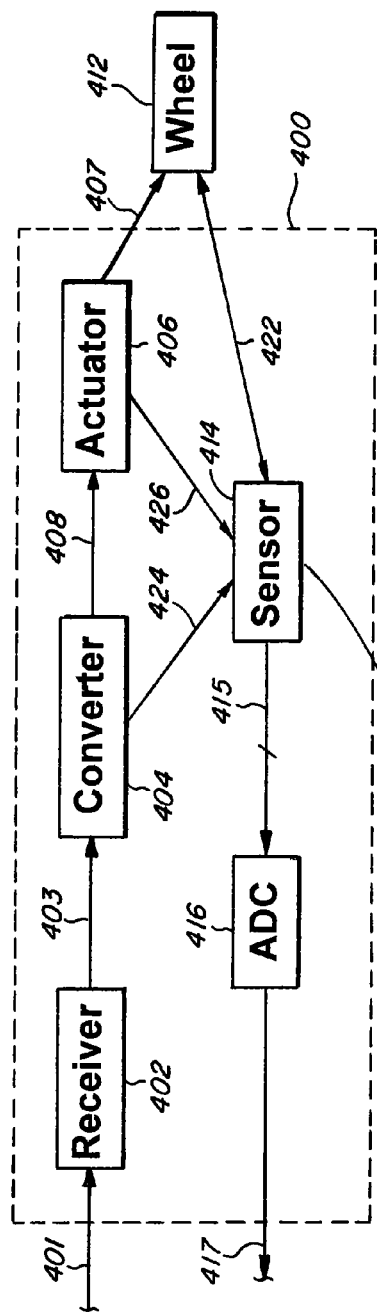
FIG. 4A shows a schematic view of a local braking device according to an embodiment of the present invention.

The discussion now turns to the internal structure of the braking device. In FIG. 4A, a schematic view of a braking device 400 is shown according to an embodiment of the present invention. The braking device 400 may be an exemplary embodiment of the braking devices 142, 144, 146, and 148, such that it may be used for realizing the functional features of the braking devices 142, 144, 146, and 148 as discussed in FIGS. 1A and 1B. Although the architecture of the braking device 400 is used to illustrate one embodiment of the braking devices 142, 144, 146, and 148, other architectures may be used for realizing the functional features of the braking devices 142, 144, 146, and 148.

Generally, the braking device 400 may include a receiver 402, a converter 404, an actuator 406, a sensor 414, and an analog-to-digital converter (ADC) 416. The receiver 402 may be used to receive an electronic brake signal 401, which may be generated by the control device 200 as discussed in FIG. 2. After receiving the electronic brake signal 401, the receiver 402 may convert the electronic brake signal 401 to an analog brake signal 403. The analog brake signal 403 may have a magnitude component and a frequency component, both of which may be related to the application of the local brake force. For example, the magnitude component of the analog brake signal 403 may control the absolute value of the local brake force to be applied, whereas the frequency component of the analog brake signal 403 may control a rate of application of the local brake force.

The converter 404 may be coupled to the receiver 402, and it may be used to convert the analog brake signal 403 to a mechanical brake force 408. In one embodiment, the converter 404 may transform the analog brake signal 403 to generate a magnetic field, in which a magnetic force may be created and redirected to become the mechanical brake force 408. For example, the converter 404 may be a transformer coupled to a pair of electromagnetic plates, such that the electromagnetic plates may receive energy from the transformer and generate a magnetic field in between them. As a result, the magnetic field may induce a magnetic force which may be used for attracting the pair of electromagnetic plates to each other. Accordingly, the magnetic force may be directly redirected to become the mechanical brake force 408.

The actuator 406 may be coupled to the converter 404, and it may thus receive the mechanical brake force 408 generated by the converter 404. The actuator 406 may be configured to apply or impart the mechanical brake force 407 to the respective wheel 412 for reducing the rotational speed thereof. Particularly, the actuator 406 may apply or impart the mechanical brake force 407 to at least one of the FL, FR, BL, or BR mechanical device 162, 164, 166, or 168, which may be coupled to the wheel 412. More particularly, each of the FL, FR, BL, and BR mechanical devices 162, 164, 166, and 168 may be at least one of a rotor or a drum for receiving the mechanical brake force 407.

The sensor 414 may be coupled to the converter 404, the actuator 406, and the wheel 412 for sensing various real time physical conditions related to the overall operation of the braking device 400. In one embodiment, for example, the sensor 414 may be coupled to the converter 404 via a first connection 424. The first connection 424 may transmit information related to the operation status of the converter 404, which may help the sensor 414 to ascertain whether the converter 404 may be functioning properly during the deceleration of the vehicle. In another embodiment, for example, the sensor 414 may be coupled to the actuator 406 via a second connection 426. The second connection 426 may transmit information related to the operation status of the actuator 406, which may help the sensor 414 to ascertain whether the actuator 406 may be functioning properly during the deceleration of the vehicle. In yet another embodiment, for example, the sensor 414 may be coupled to the wheel 412 via a third connection 422. The third connection 422 may transmit information related to the number of rotations (revolutions) per minute of the wheel 412, which may help the sensor 414 to sense the rotational speed of the wheel 412. Additionally, the third connection 422 may also transmit information related to the internal gas pressure of the wheel 412, which may help the sensor 414 to sense the normal force asserted against the wheel 412.

The first, second, and third connections 424, 426, and 422 may be established by one or more conducting wires and/or wireless media. The sensor 414 may be an individual device, which may be installed separately from the converter 404, the actuator 406, and the wheel 412. Alternatively, the sensor 414 may include various sensing devices, each of which may be embedded in at least one of the converter 404, the actuator 406, or the wheel 412.

Figure 4B:
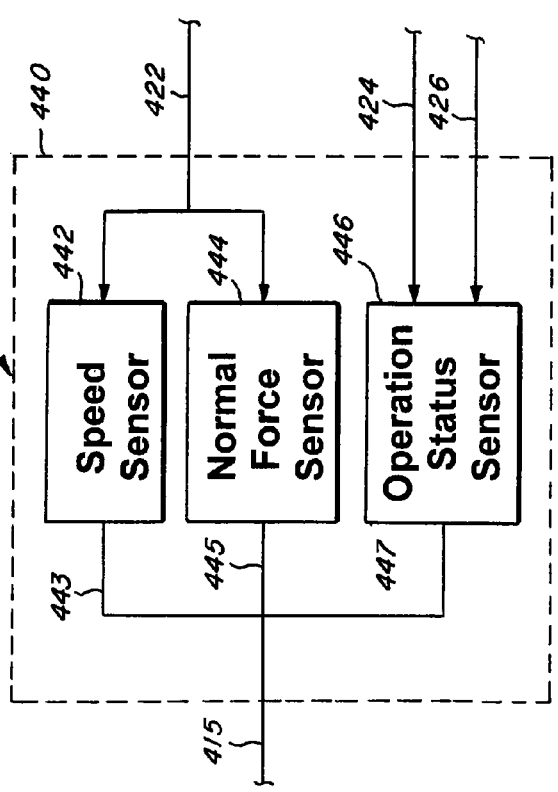
FIG. 4B shows a schematic view of a sensor which may be used in a local braking device according to an embodiment of the present invention.

FIG. 4B shows a schematic view of a sensor 440 according to an embodiment of the present invention. The sensor 440 may be an exemplary embodiment of the sensor 414, such that it may be used for realizing the various functions of the sensor 414 as discussed in FIG. 4A. Although the architecture of the sensor 440 is used to illustrate one embodiment of the sensor 414, other architectures may be used for realizing the functional features of the sensor 414.

The sensor 440 may include a speed sensor 442, a normal force sensor 444, and an operation status sensor 446. In one embodiment, the speed sensor 442, the normal force sensor 444, and the operation status sensor 446 may be implemented by one single device. In another embodiment, the speed sensor 442 may be implemented by a first sensing device, the normal force sensor 444 may be implemented by a second sensing device, and the operation status sensor 446 may be implemented by a third sensing device.

More specifically, the speed sensor 442 may be used to sense or detect a rotational speed 443, the normal force sensor 444 may be used to sense or detect a normal force 445, and the operation status sensor 446 may be used to sense or detect an operation status 447. The speed sensor 442, the normal force sensor 444, and the operation status sensor 446 may be programmed to iteratively, periodically, continuously, or randomly sense the respective physical conditions related to the braking device 400 an/or the wheel 412. The information related to the sensed or detected rotational speed 443, the normal force 445, and the operation status 447 may all be carried by a sensing signal 415. In one embodiment, for example, the value of each of the rotational speed 443, the normal force 445, and the operation status 447 may be represented by a particular range of voltages. In another embodiment, for example, the value of each of the rotational speed 443, the normal force 445, and the operation status 447 may be represented by a particular range of frequencies. In yet another embodiment, for example, the value of each of the rotational speed 443, the normal force 445, and the operation status 447 may be represented by a particular multiplexed channel of the sensing signal 415.

The ADC 416 may be coupled to the sensor 414, such that it may receive the sensing signal 415. The ADC 416 may convert the sensing signal 415 to a digital feedback signal 417, which may be further processed by the control device 200. The digital feedback signal 417 may be conducted serially by a single second conducting device. Alternatively, the digital feedback signal 417 may be conducted in parallel by a plurality of second conducting device. Although the ADC 416 is included in the braking device 400 in FIG. 4A, the braking device 400 may function without the ADC 416 according to another embodiment of the present invention. Mainly, if the electronic feedback signal is conducted in analog form, the sensing signal 415 may be treated or processed as the electronic feedback signals. On one hand, the digital feedback signal may be advantageous over the analog signal because it is less susceptible to noise. On the other hand, the analog feedback signal may be advantageous over the digital signal because it may be more compact and may thus be conducted with fewer second conducting devices.

Figures 5A, 5B:
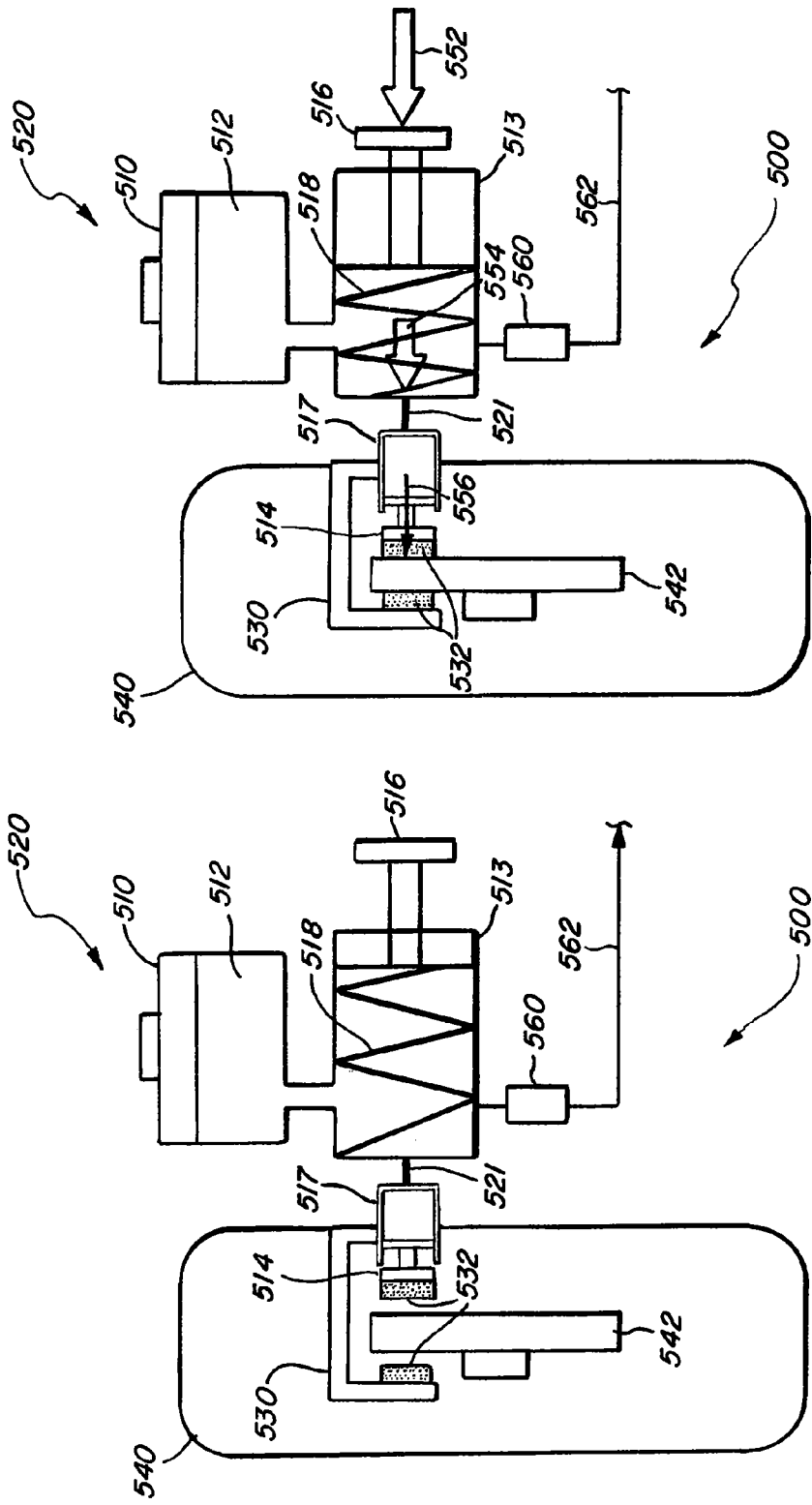
FIGS. 5A-5B show a cross-sectional front view of an actuator implemented by a hydraulic device according to an embodiment of the present invention.

The discussion now turns to an exemplary actuator. In FIGS. 5A-5B, the cross-sectional front views of an actuator 500 are shown. According to an embodiment of the present invention, the functional features of the actuator 406 as discussed in FIG. 4A may be realized by the actuator 500, which may include a local hydraulic system 520 coupled to a brake caliper 530. Specifically, the brake caliper 530 may have a pair of brake pads 532, and the local hydraulic system 520 may have a local reservoir 510, a brake fluid 512, a local master cylinder 513, a local pump 516 a local solenoid valve 518, a local hydraulic line 521, a local brake cylinder 517, and a local brake piston 514.

As shown in FIG. 5A, the local reservoir 510 may be used to store the brake fluid 512, which may be pumped out of the local master cylinder 513 by the local pump 516. Moreover, the local brake cylinder 517 may receive the brake fluid 512 from the local master cylinder 513 via the local hydraulic line 521, such that the local brake piston 514 may be in fluid communication with the local master cylinder 513. When the local pump 516 is at a non-braking state, the local solenoid valve 518 may push the local pump 516 to one end of the master cylinder 513 such that the brake fluid 512 may substantially fill up the master cylinder 513 as shown in FIG. 5A. Accordingly, the local brake piston 514 may receive little hydraulic pressure such that the brake caliper 532 may be free from contacting the rotor or the drum 542 of the wheel 540.

Referring to FIG. 5B, the local pump 516 may receive a mechanical brake force 552, which may be generated by the converter 404 as discussed in FIG. 4A. The local pump 516 may be used to compress the local solenoid valve 518 such that the brake fluid 512 may be pumped out of the local master cylinder 513. As a result, the pumped out brake fluid 512 may travel along the local hydraulic line 521 and enter into the local brake cylinder 517 to assert an increased pressure 556 against the local brake piston 514. Because of the increased pressure 556 brought by the additional brake fluid 512, the local brake piston 514 may push the brake pads 532 towards each other, and eventually the brake pads 532 may contact the rotor or the drum 542 of the wheel 540. When the increased pressure 556 reaches a certain threshold, the brake pads 532 may begin imparting frictional force on the surface of the rotor or the drum 542. Consequentially, the frictional force may reduce the rotational speed of the wheel 540, and thereby decelerating the vehicle.

As shown in FIGS. 5A and 5B, the actuator 500 may include an optional sensing device 560 for sensing the hydraulic pressure within the local master cylinder 513. Specifically, the sensing device 560 may generate an electronic signal 562 which may signify the operation status of the local hydraulic system 520. For example, if the hydraulic pressure within the local master cylinder 513 is within a normal operation range, the electronic signal 562 may have a low value or a low state, which may signify that the local hydraulic system 520 is functioning properly. For another example, if the hydraulic pressure within the local master cylinder 513 is out of the normal operation range, the electronic signal 562 may have a high value or a high state, which may signify that the local hydraulic system 520 is failing. The electronic signal 562 may be incorporated by the sensor 414, digitized by the ADC 416, and eventually received by the control device 200. Advantageously, the control device 200 may monitor the operation status of each of the four actuators 500, and it may redistribute the total braking force 213 should one or more actuators 500 fail to perform during the deceleration process.

Compared to conventional hydraulic system, the local hydraulic system 520 may have several advantages. First, the local hydraulic lines 521 may be substantially shorter than the hydraulic lines used in a conventional hydraulic system, such that the local hydraulic lines 521 may be cheaper and easier to install. Second, the local master cylinders 513 may require less total brake fluid because the mechanical forces 552 may be pre-amplified by the converter 404. Third, the multiple local master cylinders configuration may provide a better fail-proved mechanism than a conventional single master cylinder configuration. Fourth, adopting the local hydraulic system 520 may help reduce the weight of the vehicle because of the reduced hydraulic lines and the reduced amount of brake fluid. Accordingly, the local hydraulic system 520 may provide substantial improvement over conventional hydraulic systems.

The discussion now turns to an integrated actuator, which may be used in the local braking device 400 to realize the functional features of both the converter 404 and the actuator 406. In FIGS. 6A and 6B, the cross-sectional front views of an integrated actuator 600 are shown, according to an embodiment of the present invention. Generally, the integrated actuator 600 may include first and second metallic plates 602 and 604, an electromagnet 603, a restoring spring 606, and a pair of brake pads 605. More specifically, the electromagnet 603 may receive an analog brake signal 601 generated by the receiver 402 as shown in FIG. 4A, and the analog brake signal 601 may carry an alternate current for powering the electromagnet 603.

When the vehicle is not undergoing any deceleration process, the analog brake signal 601 may carry very little or no alternate current. As such, the electromagnet 603 may receive no power, and the restoring spring 606 may push the first and second metallic plates 602 and 604 away from each other. Consequentially, the pair of brake pads 605 may be free from contacting the rotor 642 of the wheel 640. When the vehicle receives the brake command from the driver, the analog brake signal 601 may carry a sufficient amount of alternate current to power the electromagnet 603. As such, the electromagnet 603 may produce a magnetic field, which may induce a magnetic force 604 to pull the second metallic plate 604 closer to the first metallic plate 602.

When the magnetic field is strong enough, the magnetic force 604 may compress the restoring spring 606. As a result, the second metallic plate 604 may transfer the magnetic force 620 to a mechanical brake force 622, which may be used to push the pair of brake pads 605 to contact the surface of the rotor or the drum 642 of the wheel 640. When the magnetic force 620 increases to reach a certain threshold, the brake pads 605 may begin imparting frictional force on the surface of the rotor. Consequentially, the frictional force may reduce the rotational speed of the wheel 640, and thereby decelerating the vehicle.

Compared to the conventional hydraulic system, the integrated actuator 600 may have several advantages. First, the integrated actuator 600 may completely eliminate the use of hydraulic lines, so that the integrated actuator 600 may be cheaper and easier to install. Second, the integrated actuator 600 may completely eliminate the use of brake fluid as well as master cylinder and the local brake cylinders, so that the integrated actuator 600 may be free of any brake fluid leakage problem, which may be common in the conventional hydraulic systems. Third, adopting the integrated actuator 600 may help reduce the weight of the vehicle because the components of the integrated actuator 600 are lighter than the components of a conventional hydraulic system. Accordingly, the integrated actuator 600 may provide substantial improvement over a conventional hydraulic system.

Figure 7:
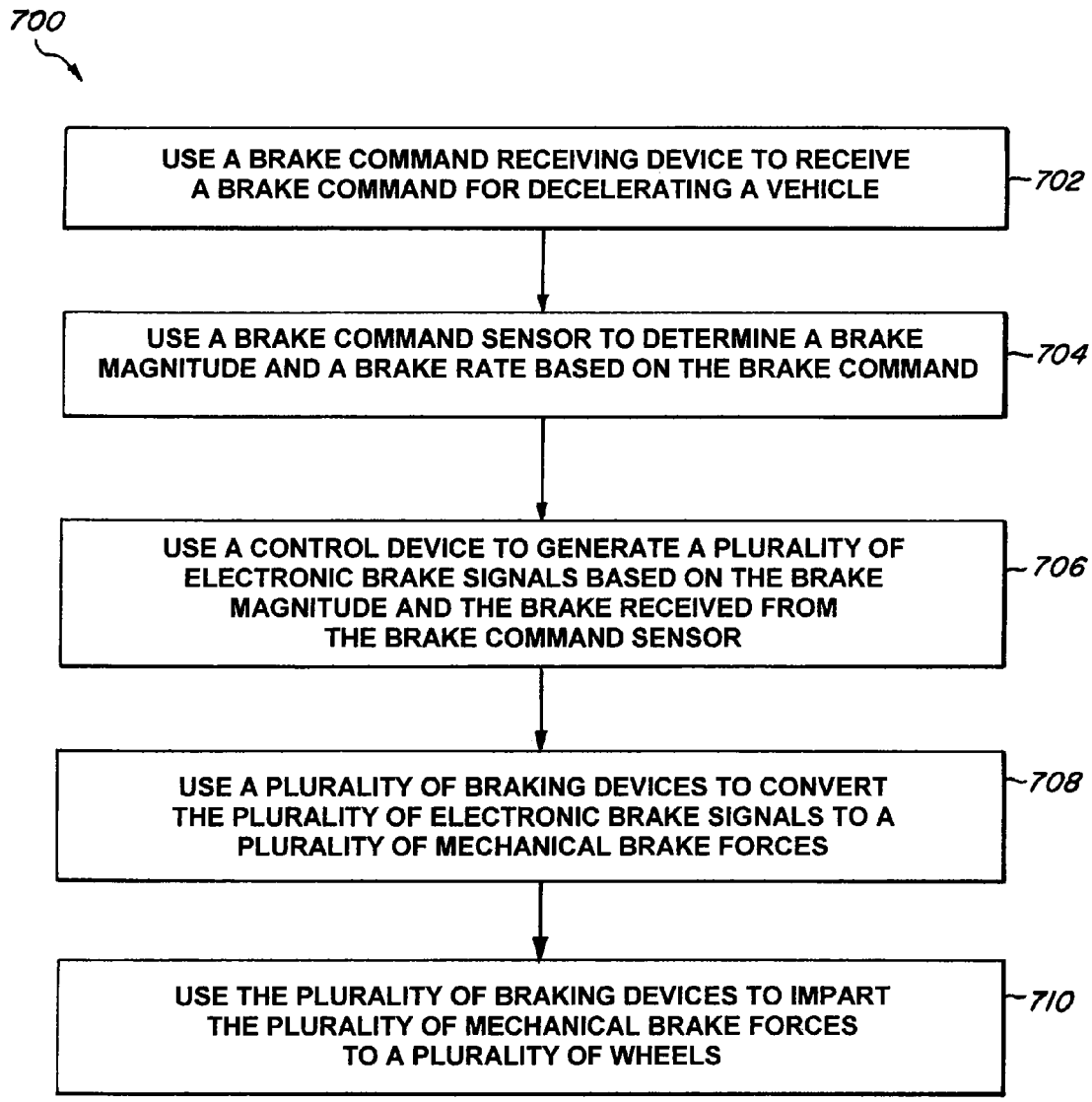
FIG. 7 shows a flow chart of a method for decelerating a vehicle according to an embodiment of the present invention.

The discussion now turns to various methods for operating the electromechanical deceleration system, and the components thereof, as shown in FIGS. 1-6. In FIG. 7, a flow chart of a method 700 for decelerating a vehicle is shown according to an embodiment of the present invention. In step 702, a brake command receiving device may be used to receive a brake command for decelerating a vehicle. In step 704, a brake command sensor may be used to determine a brake magnitude and a brake rate based on the brake command received by a brake command receiving device. In step 706, a control device may be used to generate a plurality of electronic brake signals based on the brake magnitude and the brake rate received from the brake command sensor. In step 708, a plurality of braking devices may be used to convert the plurality of electronic brake signals to a plurality of mechanical brake forces. In step 710, the plurality of braking devices may be used to impart the plurality of mechanical brake forces to a plurality of wheels.

Figure 8:
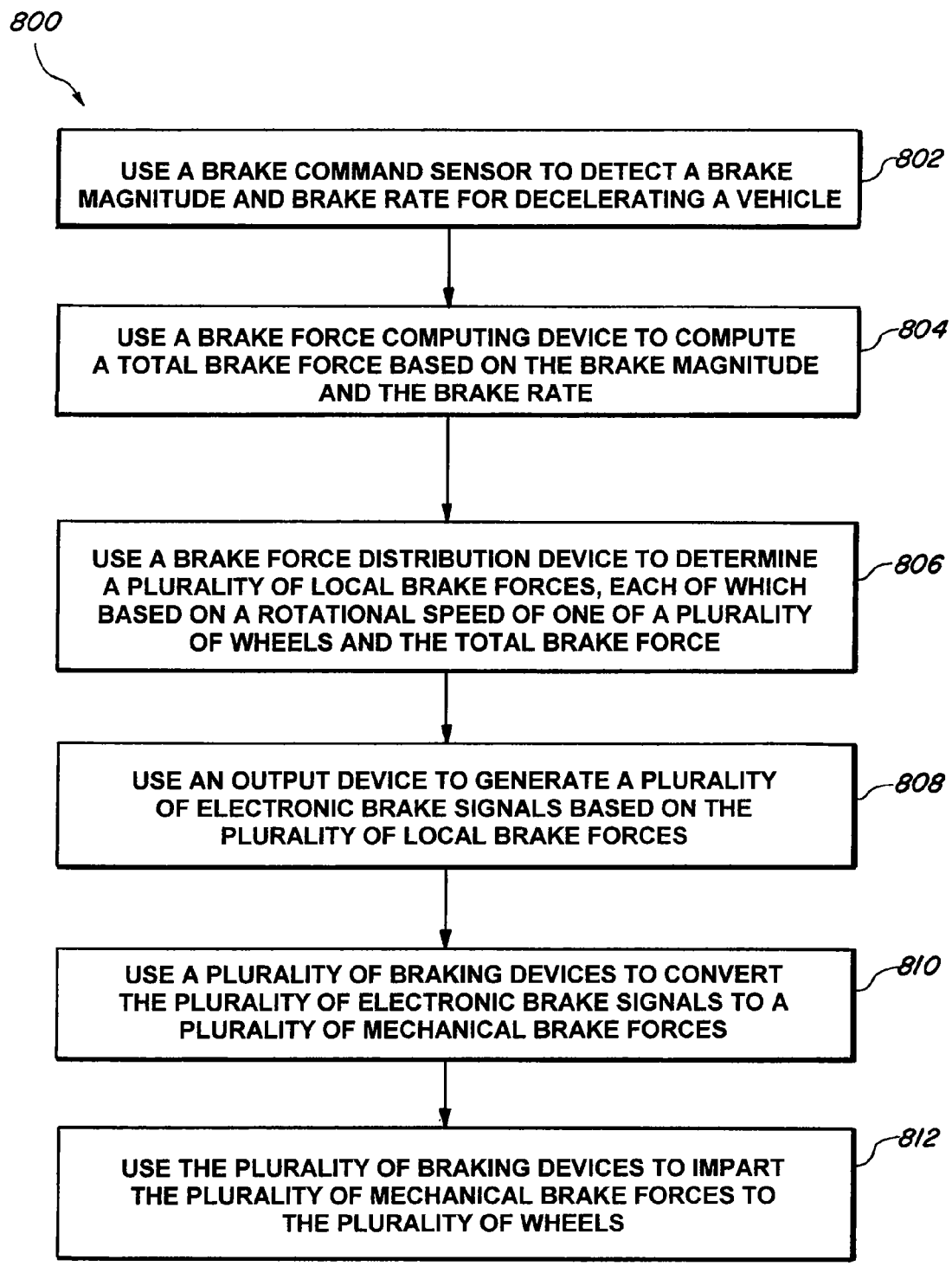
FIG. 8 shows a flow chart of another method for decelerating a vehicle according to another embodiment of the present invention.

In FIG. 8, a flow chart of another method 800 for decelerating a vehicle is shown according to another embodiment of the present invention. In step 802, a brake command sensor may be used to detect a brake magnitude and a brake rate for decelerating a vehicle. In step 804, a brake force computing device may be used to compute a total brake force based on the brake magnitude and the brake rate. In step 806, a brake force distribution device may be used to determine a plurality of local brake forces, each of which may be based on a rotational speed of one of a plurality of wheels and the total brake force. In step 808, an output device may be used to generate a plurality of electronic brake signals based on the plurality of local brake forces. In step 810, a plurality of braking device may be used to convert the plurality of electronic brake signals to a plurality of mechanical brake forces. In step 812, the plurality of braking devices may be used to impart the plurality of mechanical brake forces to the plurality of wheels.

Figure 9:
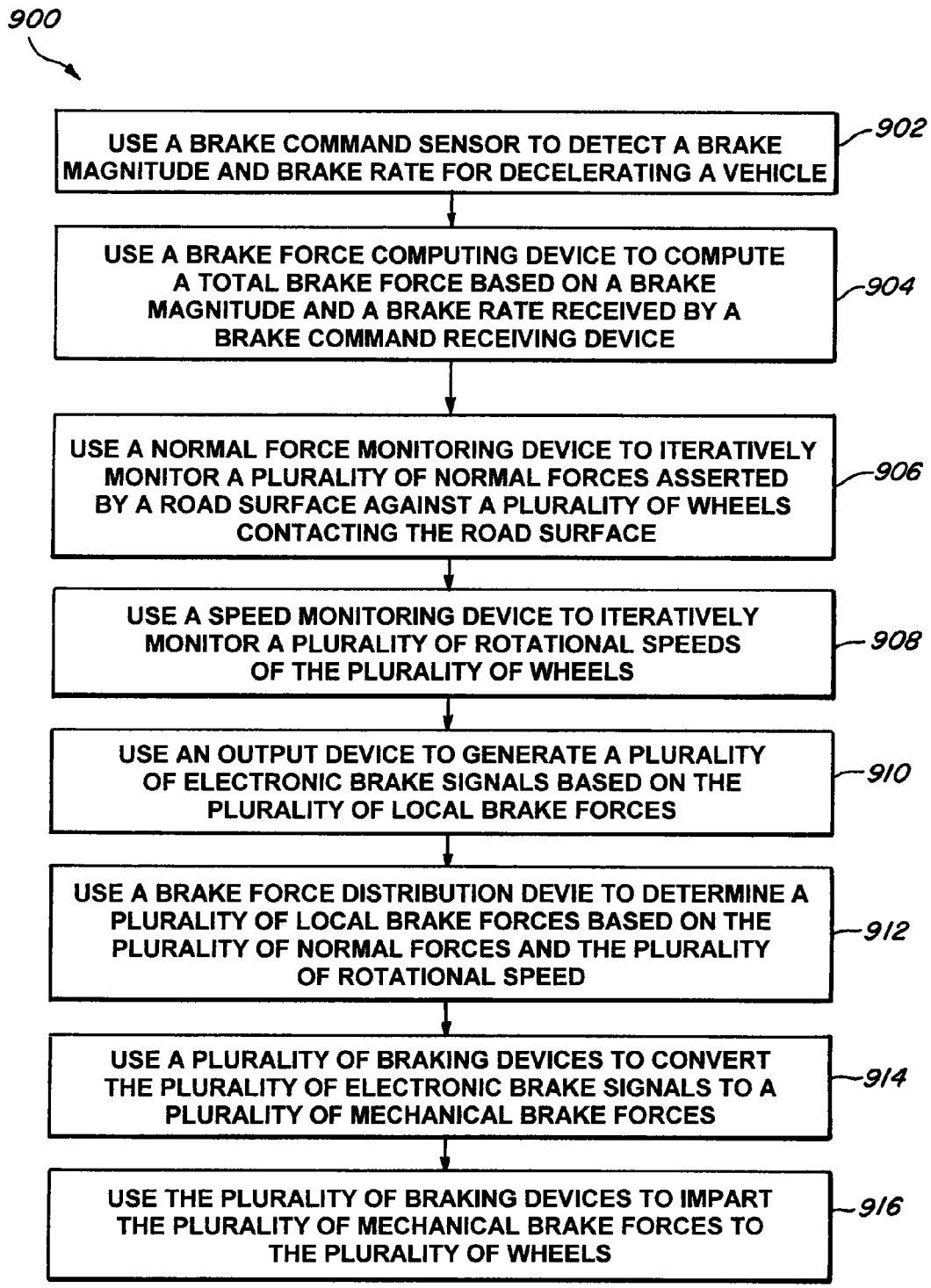
FIG. 9 shows a flow chart of another method for decelerating a vehicle according to another embodiment of the present invention.

In FIG. 9, a flow chart of another method 900 for decelerating a vehicle is shown according to another embodiment of the present invention. In step 902, a brake command sensor may be used to receive a brake magnitude and a brake rate for decelerating a vehicle. In step 904, a brake force computing device may be used to compute a total brake force based on the brake magnitude and the brake rate. In step 906, a normal force monitoring device may be used to iteratively monitor a plurality of normal forces asserted by a road surface against a plurality of wheels contacting the road surface. In step 908, a speed monitoring device may be used to iteratively monitor a plurality of rotational speeds of the plurality of wheels. In step 910, a brake force distribution device may be used to determine a plurality of local brake forces based on the plurality of normal forces and the plurality of rotational speeds. In step 912, an output device may be used to generate a plurality of electronic brake signals based on the plurality of local brake forces. In step 914, a plurality of braking devices may be used to convert the plurality of electronic brake signals to a plurality of mechanical brake forces. In step 916, the plurality of braking devices may be used to impart the plurality of mechanical brake forces to the plurality of wheels.

Figure 10:
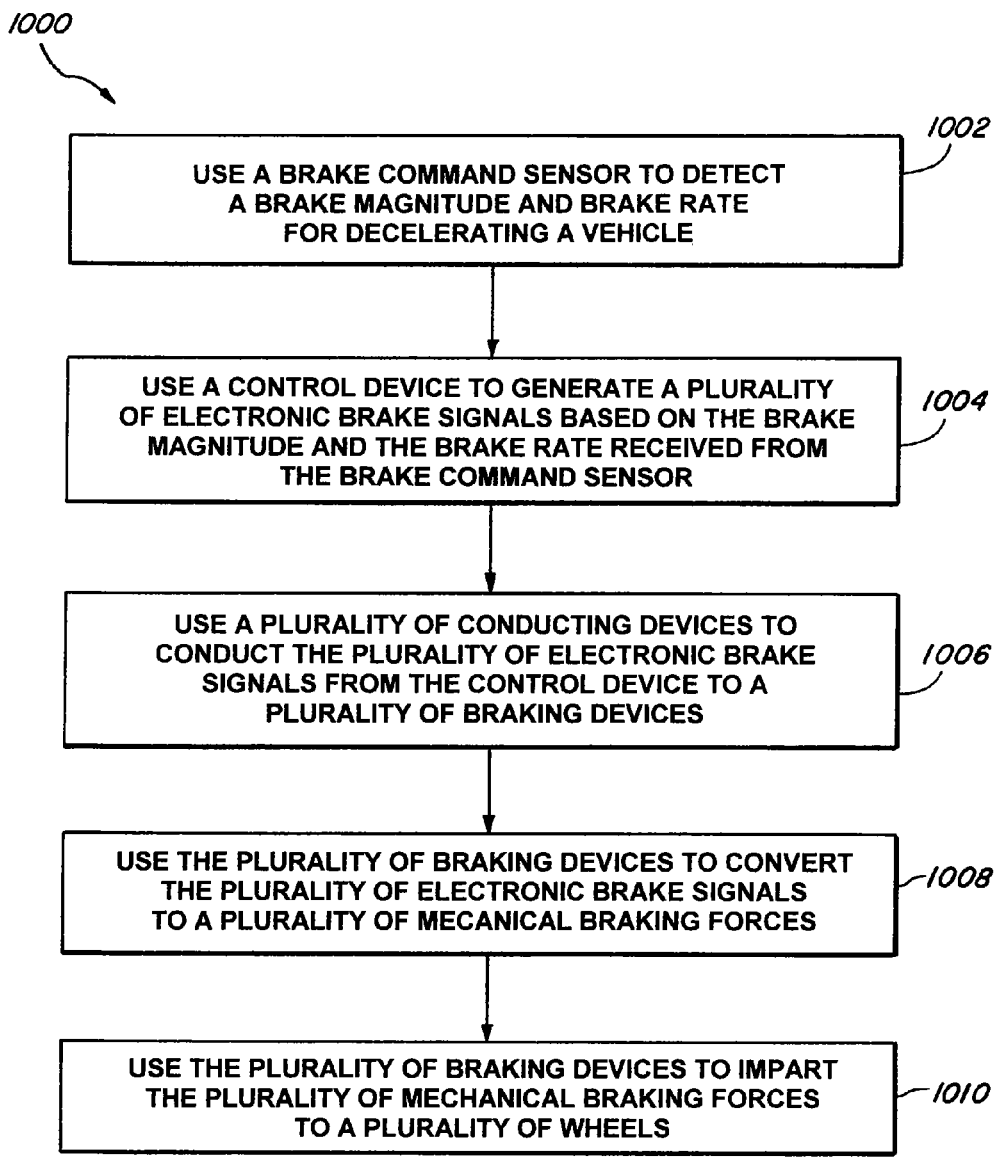
FIG. 10 shows a flow chart of yet another method for decelerating a vehicle according to yet another embodiment of the present invention.

In FIG. 10, a flow chart of yet another method 1000 for decelerating a vehicle is shown according to yet another embodiment of the present invention. In step 1002, a brake command sensor may be used to receive a brake magnitude and a brake rate for decelerating a vehicle. In step 1004, a control device may be used to generate a plurality of electronic brake signals based on the brake magnitude and the brake rate received from a brake command sensor. In step 1006, a plurality of conducting devices may be used to conduct the plurality of electronic brake signals from the control device to a plurality of braking devices. In step 1008, the plurality of braking devices may be used to convert the plurality of electronic brake signals to a plurality of mechanical brake forces. In step 1010, the plurality of braking devices may be used to impart the plurality of mechanical brake forces to the plurality of wheels.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A deceleration system for decreasing a speed of a vehicle having a plurality of wheels, the plurality of wheels positioned within a plurality of local regions of the vehicle, each of the plurality of wheels having a rotational speed, the deceleration system comprising:

a brake command receiving device configured to receive a brake command for decelerating the vehicle, the brake command receiving device position within a central region of the vehicle, the central region spaced apart from the plurality of local regions;

a brake command sensor coupled to the brake command receiving device, and configured to sense the brake command and generate a brake application signal based on the sensed brake command;

a control device coupled to the brake command sensor, and configured to:
 receive the generated brake application signal from the brake command sensor,
 compute a total brake force based on at least the generated brake application signal,
 determine a plurality of local brake forces, each of the plurality of local brake forces being based on the total brake force and the rotational speed of at least one of the plurality of wheels, and generate a plurality of electronic brake signals based on at least the plurality of local brake forces; and a plurality of braking devices positioned within the plurality of local regions, each of the plurality of braking devices coupled to the control device and one of the plurality of wheels, and configured to receive one of the plurality of electronic brake signals, convert the respective electronic brake signal to a respective mechanical brake force for causing a deceleration of the vehicle.

2. The system of claim 1, wherein the brake command sensor and the control device are positioned within the central region of the vehicle.

3. The system of claim 1, wherein the brake application signal corresponds to a brake magnitude and a brake rate, and the control device includes:

a brake force computing device configured to perform the receiving the brake magnitude and the brake rate from the brake command sensor and to perform the computing the total brake force based on the brake magnitude and the brake rate, a brake force distribution device coupled to the brake force computing device, and configured to perform the determining the plurality of local brake forces, and an output device coupled to the brake force distribution device, and configured to perform the generating the plurality of electronic brake signals based on the at least the plurality of local brake forces.

4. The system of claim 3, wherein the control device further includes a normal force monitoring device configured to iteratively monitor a plurality of normal forces asserted by a road surface against the plurality of wheels contacting the road surface, such that the brake force distribution device determines each of the plurality of local brake forces based on one of the plurality of normal forces and the rotational speed of the respective wheel.

5. The system of claim 1, wherein the control device includes a speed monitoring device configured to iteratively monitor the rotational speed of the at least one of the plurality of wheels while the brake command is being received.

6. The system of claim 1, wherein each of the plurality of the braking devices includes:

a receiver configured to receive one of the plurality of electronic brake signals and to convert the perspective electronic brake signal to an analog brake signal, a converter coupled to the receiver, and configured to convert the respective analog brake signal to the respective mechanical brake force, and an actuator coupled to the converter, and configured to impart the respective mechanical brake force against the respective wheel, thereby causing a deceleration thereof.

7. The system of claim 1, wherein each of the plurality of braking devices includes a hydraulic device configured to generate the respective mechanical brake force.

8. The system of claim 1, wherein each of the plurality of braking devices includes an electromagnetic device configured to generate the respective mechanical brake force.

9. The system of claim 1, wherein each of the plurality of wheels is adjacent to at least one of a rotor or a drum, and wherein each of the plurality of braking devices includes a brake caliper having a plurality of brake pads, the caliper is configured to impart the respective mechanical brake force to the at least one of the rotor or the drum of the respective wheel by engaging the plurality of brake pads to the at least one of the rotor or the drum, thereby introducing a plurality of frictional force for reducing the rotational speed of the respective wheel.

10. The system of claim 1, further comprising a plurality of first conducting devices coupled between the control device and the plurality of braking devices, and configured to conduct the plurality of electronic brake signals from the control device to the plurality of braking devices, the plurality of first conducting devices distributed across an intermediate region of the vehicle, wherein the intermediate region is positioned between the central region and the plurality of local regions of the vehicle.

11. The system of claim 10, further comprising:

a plurality of wheel speed sensors coupled to the plurality of wheels, configured to generate a plurality of wheel speed signals, each of the plurality of wheel speed signals representative of a rotational speed of one of the plurality of wheels; and a plurality of second conducting devices coupled between control device and the plurality of wheel speed sensors, and configured to conduct the plurality of wheel speed signals from the plurality of wheel speed sensors to the control device, the plurality of second conducting devices distributed across the intermediate region of the vehicle.

12. A deceleration system for decreasing a speed of a vehicle having a plurality of wheels, the plurality of wheels positioned within a plurality of local regions of the vehicle, each of the plurality of wheels having at least one of a rotor or a drum, the deceleration system comprising:

a brake command receiving device configured to receive a brake command for decelerating the vehicle, the brake command receiving device position within a central region of the vehicle, the central region spaced apart from the plurality of local regions;

a brake command sensor coupled to the brake command receiving device, and configured to determine a brake magnitude and a brake rate based on the brake command;

a control device positioned within the central region, and having:

a brake force computing device coupled to the brake command sensor, and configured to compute a total brake force based on the brake magnitude and the brake rate, a brake force distribution device coupled to the brake force computing device, and configured to determine a plurality of local brake forces, each of the plurality of brake forces based on a rotational speed of one of the plurality of wheels and the total brake force, and an output device coupled to the brake force distribution device, and configured to generate the plurality of electronic brake signals based on the plurality of local brake forces; and a plurality of braking devices positioned within the plurality of local regions, each of the plurality of braking devices coupled to one of the plurality of wheels, and configured to receive one of the plurality of electronic brake signals, convert the respective electronic brake signal to a respective mechanical brake force, and impart the respective mechanical brake force to the rotor or the drum of the respective wheel, thereby causing a deceleration of the vehicle.

13. The system of claim 12, wherein the control device includes:

a speed monitoring device configured to iteratively monitor the rotational speeds of the plurality of wheels while the brake command is being received, and a normal force monitoring device configured to iteratively monitor a plurality of normal forces asserted by a road surface against the plurality of wheels contacting the road surface while the brake command is being received, such that the brake force distribution device determines each of the plurality of local brake forces based on one of the plurality of normal forces and the rotational speed of the respective wheel.

14. The system of claim 12, wherein the each of the plurality of the braking devices includes:
a receiver configured to receive one of the plurality of electronic brake signals and to convert the perspective electronic brake signal to an analog brake signal,
an converter coupled to the receiver, and configured to convert the respective analog brake signal to the respective mechanical brake force, and
an actuator coupled to the converter, and configured to impart the respective mechanical brake force against the respective wheel, thereby causing a deceleration thereof.

15. The system of claim 12, wherein each of the plurality of braking devices includes a device selected from a group consisting of a hydraulic device, an electromagnetic device, a brake caliper, and combinations thereof.

16. The system of claim 12, further comprising:
a plurality of first conducting devices coupled between the control device and the plurality of braking devices, and configured to conduct the plurality of electronic brake signals from the control device to the plurality of braking devices, the plurality of first conducting devices distributed across an intermediate region of the vehicle, wherein the intermediate region is positioned between the central region and the plurality of local regions of the vehicle;
a plurality of wheel speed sensors coupled to the plurality of wheels, configured to generate a plurality of wheel speed signals, each of the plurality of wheel speed signals representative of a rotational speed of one of the plurality of wheels; and
a plurality of second conducting devices coupled between control device and the plurality of wheel speed sensors, and configured to conduct the plurality of wheel speed signals from the plurality of wheel speed sensors to the control device, the plurality of second conducting devices distributed across the intermediate region of the vehicle.

17. A method for decelerating a vehicle having a central region and a plurality of local regions, the vehicle further having a plurality of wheels each having at least one of a rotor or a drum and each having a rotational speed, the plurality of wheels positioned within the plurality of local regions of the vehicle, the method comprising the steps of:
receiving, using a brake command receiving device positioned within the central region of the vehicle, a brake command for decelerating the vehicle;
determining, using a brake command sensor coupled to the brake command receiving device, a brake magnitude and a brake rate based on the received brake command;
computing, using a control device positioned within the central region and coupled to the brake command sensor, a total brake force based on the brake magnitude and the brake rate,
determining, using the control device, a plurality of local brake forces, each based on the rotational speed of at least one of the plurality of wheels and the total brake force, and
generating, using the control device, a plurality of electronic brake signals based on the plurality of local brake forces;
converting, using a plurality of braking devices coupled to the control device and positioned within the plurality of local regions, the plurality of electronic brake signals to a plurality of mechanical brake forces; and
imparting, using the plurality of braking devices, the plurality of mechanical brake forces to the rotor or the drums of the plurality of wheels, thereby decelerating the vehicle.

18. The method of claim 17, wherein the control device includes:
a brake force computing device coupled to the brake command sensor, and configured to perform the step of computing the total brake force based on the brake magnitude and the brake rate,
a brake force distribution device coupled to the brake force computing device, the brake force distribution device being configured to perform the step of determining the plurality of local brake forces, and
an output device coupled to the brake force distribution device, the output device configured to perform the step of generating the plurality of electronic brake signals based on the plurality of local brake forces.

19. The method of claim 18, wherein the determining the plurality of local brake forces include, while the brake command is being received:
iteratively monitoring, using a normal force monitoring device, at least one normal force asserted by a road surface against the at least one of the plurality of wheels contacting the road surface, and
iteratively monitoring, using at least one speed monitoring device, the rotational speed of the at least one of the plurality of wheels,
wherein the plurality of local forces are based on the iteratively monitored at least one normal force and the iteratively monitored rotational speed of the at least one of the plurality of wheels.

20. The method of claim 17, further comprising the step of:
conducting, using a plurality of conducting devices coupled between the control device and the plurality of braking devices, the plurality of electronic brake signals from the control device to the plurality of braking devices,
wherein the plurality of first conducting devices distributed across an intermediate region of the vehicle, and the intermediate region is positioned between the central region and the plurality of local regions of the vehicle.

* * * * *